(12) United States Patent  
Shiratori et al.

(10) Patent No.: US 8,336,656 B2  
(45) Date of Patent: Dec. 25, 2012

(54) ECU ARRANGEMENT STRUCTURE FOR A VEHICLE

(75) Inventors: Kenichi Shiratori, Wako (JP); Tomohiko Yashiro, Wako (JP); Sho Yamamoto, Wako (JP); Yuichiro Tsuruta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 310 days.

(21) Appl. No.: 12/714,840

(22) Filed: Mar. 1, 2010

(65) Prior Publication Data  
US 2010/0236852 A1  Sep. 23, 2010

(30) Foreign Application Priority Data  
Mar. 18, 2009  (JP) ................. 2009-066255

(51) Int. Cl.  
*B60K 13/02* (2006.01)

(52) U.S. Cl. .............. 180/68.3; 180/68.1; 180/68.2

(58) Field of Classification Search .......... 180/68.1, 180/68.2, 68.3, 68.4, 292, 296, 248, 444  
See application file for complete search history.

(56) References Cited

U.S. PATENT DOCUMENTS

| 4,757,872 | A  | * | 7/1988  | Inomata ................... 180/291 |
|-----------|----|---|---------|-------------------------------------|
| 5,117,932 | A  | * | 6/1992  | Kurosu et al. ............ 180/68.2 |
| 7,311,170 | B2 | * | 12/2007 | Isoda et al. .............. 180/296 |
| 7,475,748 | B2 | * | 1/2009  | Nakamura et al. ........ 180/68.1 |
| 7,712,562 | B2 | * | 5/2010  | Nozaki ................... 180/68.3 |
| 7,730,986 | B2 | * | 6/2010  | Takeshima et al. ....... 180/68.5 |
| 7,828,098 | B2 | * | 11/2010 | Yamamoto et al. ....... 180/68.5 |
| 2002/0023792 | A1 | * | 2/2002 | Bouffard et al. ......... 180/68.4 |
| 2002/0088661 | A1 | * | 7/2002 | Gagnon et al. ........... 180/248 |
| 2005/0257990 | A1 | * | 11/2005 | Shimizu ................. 180/444 |
| 2008/0099263 | A1 | * | 5/2008 | Takeshima et al. ....... 180/68.3 |

FOREIGN PATENT DOCUMENTS  
JP  4202610  10/2008

* cited by examiner

*Primary Examiner* — Hau Phan  
(74) *Attorney, Agent, or Firm* — Squire Sanders (US) LLP (57) ABSTRACT

An engine controller structure for a vehicle, can include a duct cover having a box-like portion on a vehicle body front side thereof. The box-like portion can include an opening formed therein, and can be configured to have an intake duct of an engine connected thereto. The duct cover can be configured to be positioned sidewardly of an engine. An engine control unit can be disposed on the inside of the duct cover. The opening, configured to be connected to the intake duct, can be configured such that the intake duct is connected to an air cleaner box attached to a vehicle body rear side of the engine. The intake duct can shaped so as to be extended to a vehicle body front side from the air cleaner box.

22 Claims, 12 Drawing Sheets

ECU ARRANGEMENT STRUCTURE FOR A VEHICLE

BACKGROUND

1. Field

This invention relates to an ECU arrangement structure for a vehicle, and particularly to an ECU arrangement structure for a vehicle suitable for use with a three-wheel or four-wheel vehicle having a cabin which is not screened from the outside.

2. Description of the Related Art

An ECU (Engine Control Unit) as a controlling apparatus for a vehicle is conventionally known. Since a large number of wiring lines for inputting output signals of various sensors attached to the engine are connected to the ECU, as the distance between the ECU and the engine increases, the length of the wiring lines increases and the vehicle weight, the number of man-hours for assembly and so forth increase. Therefore, in order to suppress the length of the wiring lines, it is a possible idea to dispose the ECU in the proximity of the engine. However, it is necessary to take it into consideration to prevent the ECU, which is a precision apparatus, from being influenced by heat of the engine as a result of such arrangement of the ECU.

Patent Document 1 (Japanese Patent No. 4202610) discloses a configuration wherein, in a motorcycle including an air cleaner box provided at an upper portion of an engine, an ECU is disposed in the inside of the air cleaner box. Consequently, the ECU is disposed in the proximity of the engine while effects of heat of the engine is avoided.

In a MUV (Multi Utility Vehicle) which has a cabin which is not screened from the outside and is suitable for traveling on rough ground or the like, an engine can be frequently disposed below the cabin or at a like place and an air cleaner box is frequently disposed on the vehicle body rear side with respect to the engine. In such arrangement as just described, the temperature around the air cleaner box can be high due to heat of the engine flowing toward the rear of the vehicle body upon traveling of the vehicle. Therefore, it is difficult to apply the technique disclosed in Patent Document as it is to the MUV described above to dispose the ECU in the inside of the air cleaner box. Further, if the ECU is disposed in the inside of the air cleaner box, then the actual capacity of the air cleaner box decreases, and therefore, the actual required capacity must be assured.

SUMMARY

It is an object of the present invention to solve the subject of the prior art described above and provide an ECU arrangement structure for a vehicle wherein wiring lines connected to an ECU can be reduced in length to prevent a thermal influence upon the ECU and the cooling effect of the ECU can be raised.

Therefore, an engine controller structure for a vehicle can include, in certain embodiments, a duct cover having a box-like portion on a vehicle body front side thereof. The box-like portion can include an opening formed therein, and can be configured to have an intake duct of an engine connected thereto. The duct cover can be configured to be positioned sidewardly of an engine. An engine control unit can be disposed on the inside of the duct cover. The opening, configured to be connected to the intake duct, can be configured such that the intake duct is connected to an air cleaner box attached to a vehicle body rear side of the engine. The intake duct can shaped so as to be extended to a vehicle body front side from the air cleaner box.

In other embodiments, an engine controller structure for a vehicle can include duct cover means for covering a duct. The duct cover means can have an intake duct of an engine connected thereto. The duct cover means also can be configured to be positioned sidewardly of an engine, An engine control means for controlling the engine can be disposed on the inside of the duct cover means. The opening, which can be connected to the intake duct, can also be configured such that the intake duct is connected to an air cleaner box attached to a vehicle body rear side of the engine. The intake duct can be shaped so as to be extended to a vehicle body front side from the air cleaner box.

According to embodiments of the present invention, an ECU arrangement structure for a vehicle wherein an air cleaner box is attached to a vehicle body rear side of an engine through an intake path. External air is admitted in from an intake duct connected to the air cleaner box. The intake duct is connected on one end side thereof to the air cleaner box and is shaped so as to be extended to a vehicle body front side from the air cleaner box. The ECU arrangement structure can include a duct cover which can include, at least on the vehicle body front side, a box-like portion at which an opening is formed and to which the intake duct is connected on the other end side thereof on the vehicle body rear side of the box-like portion. The duct cover is positioned sidewardly of the engine and an ECU as an engine controlling apparatus is disposed in the inside of the duct cover.

In another embodiment, the ECU arrangement structure's for a multi-utility four-wheel vehicle having a cabin which is not screened from the outside, and has at least one seat provided substantially at the center in a vehicle body forward and backward direction of the vehicle, and with the engine is disposed rearwardly and downwardly of the at least one seat. The opening on the vehicle body front side of the duct cover is provided in an opposing relationship to a back portion of the at least one seat.

In another embodiment, the ECU arrangement structure is for a vehicle wherein the at least one seat includes a driver's seat and a passenger's seat juxtaposed with each other in a vehicle widthwise direction, and the opening on the vehicle body front side of the duct cover is provided in an opposing relationship to a back portion of one of the driver's seat and the passenger's seat.

In yet another embodiment, the ECU arrangement structure includes a plate member disposed in an opposing relationship to the back portion of the at least one seat and having a plurality of slits formed therein. The duct cover is disposed closely on the vehicle body rear side of the plate member.

In another embodiment, the ECU arrangement structure is such that the opening of the duct cover is formed continuously from the vehicle body front side to the vehicle body upper side. The opening on the vehicle body front side is disposed closely to the plate member. The opening on the vehicle body upper side is disposed closely to a bottom plate of a carrier of the vehicle.

In another embodiment, the ECU can be a substantially parallelepiped shape, and is disposed at a position displaced forwardly of the vehicle body in the inside of the duct cover such that a face thereof which has the largest area is directed to the vehicle body front side.

In another embodiment, the ECU arrangement structure is configured for a four-wheel vehicle having a vehicle body frame formed by combination of a plurality of frame pipes, wherein the duct cover is disposed at a position on the inner side in a vehicle widthwise direction with respect to the frame pipe which is positioned on the most outer side in the vehicle widthwise direction, and wherein the ECU is disposed at a position displaced to the outer side in the vehicle widthwise direction in the inside of the duct cover.

In another embodiment, the ECU is attached to the frame pipe.

In yet another embodiment, the ECU is attached to an attaching stay, which extends downwardly from the frame pipe disposed in the vehicle widthwise direction, through a cover member.

In another embodiment, the ECU is disposed at a position overlapping with the engine as viewed in a side elevation of the vehicle body.

In another embodiment, the slits are disposed on the inner side in the vehicle widthwise direction with respect to the ECU.

In certain embodiments, the intake duct is connected on one end side thereof to the air cleaner box and is shaped so as to be extended to the vehicle body front side from the air cleaner box. Further, the duct cover is provided which includes, at least on the vehicle body front side, the box-like portion at which the opening is formed and to which the intake duct is connected on the other end side thereof to the vehicle body rear side of the box-like portion. Furthermore, the duct cover is positioned sidewardly of the engine, and the ECU as an engine controlling apparatus is disposed in the inside of the duct cover. Therefore, the ECU becomes less likely to be influenced by heat of the engine and can be cooled positively by a flow of admitted external air to the air cleaner box. Consequently, it becomes possible to dispose the ECU in the proximity of the engine, and the length of wiring lines for connecting sensors attached to the engine and the ECU can be reduced. Furthermore, since the ECU is disposed in the inside of the duct cover which is a separate member from the air cleaner box, the assurance of the capacity of the air cleaner box is facilitated.

In other words, the at least one seat is provided substantially at the center in the vehicle body forward and backward direction of the vehicle, and the engine is disposed rearwardly and downwardly of the seat. Further, the opening on the vehicle body front side of the duct cover is provided in an opposing relationship to the back portion of the seat. Therefore, it becomes possible to prevent invasion of water, dust and so forth into the duct cover by means of the back portion of the seat, and the protective effect of the ECU can be raised. Further, since the opening of the duct cover is opposed to the back portion of the seat, the seat height of the seat can be prevented from becoming high.

In other embodiments, the at least one seat can include the driver's seat and the passenger's seat juxtaposed with each other in the vehicle widthwise direction and the opening on the vehicle body front side of the duct cover is provided in an opposing relationship to the back portion of one of the driver's seat and the passenger's seat. Therefore, it is possible to dispose the duct cover at the position displaced to one of the left and right in the vehicle widthwise direction. Consequently, for example, in a layout wherein the engine is disposed at the center in the widthwise direction, the duct cover and the ECU can be disposed effectively utilizing one of spaces on the left and right of the engine in the vehicle widthwise direction.

According to another embodiment, the ECU arrangement structure includes the plate member disposed in an opposing relationship to the back portion of the at least one seat and having the plurality of slits formed therein, and the duct cover is disposed closely on the vehicle body rear side of the plate member. Therefore, for example, external air can be admitted in through the slits formed in a masking shield which separates the engine room and the cabin from each other. Further, invasion of foreign articles into the opening on the vehicle body front side of the duct cover can be prevented.

According to another embodiment, the opening of the duct cover can be formed continuously from the vehicle body front side to the vehicle body upper side, and the opening on the vehicle body front side is disposed closely to the plate member. Further, the opening on the vehicle body upper side is disposed closely to the bottom plate of the carrier of the vehicle. Therefore, even if the duct cover is shaped such that it has the opening on the vehicle body upper side, the upper side opening is covered with the bottom plate of the carrier, and consequently, invasion of dust, water and so forth into the duct cover can be prevented while admission of external air only from the opening on the vehicle body front side of the duct cover is permitted. Consequently, the configuration of the duct cover can be simplified, and also its assembling operation is simplified.

According to another embodiment, the ECU has a substantially parallelepiped shape and is disposed at the position displaced forwardly of the vehicle body in the inside of the duct cover such that the face thereof which has the largest area is directed to the vehicle body front side. Therefore, the ECU becomes likely to be hit by external air, and consequently, the cooling effect of the ECU can be raised.

According to another embodiment, the vehicle is a four-wheel vehicle having a vehicle body frame formed by combination of a plurality of frame pipes, and the duct cover is disposed at the position on the inner side in the vehicle widthwise direction with respect to the frame pipe which is positioned on the most outer side in the vehicle widthwise direction. Further, the ECU is disposed at the position displaced to the outer side in the vehicle widthwise direction in the inside of the duct cover. Therefore, while the possibility that the ECU may be influenced by heat of the engine is reduced further, even when force is applied from the outside, the ECU can be protected by the frame pipe.

According to another embodiment, the ECU is attached to the frame pipe. Therefore, since the ECU can be a heavy article and can be supported on the vehicle body side, the supporting rigidity of the ECU can be raised. Further, since there is no necessity to cause the duct cover side to support the ECU, there is no necessity to raise the rigidity of the duct cover exceeding a necessary level, and reduction in weight of the duct cover can be anticipated. In addition, since the duct cover can be attached in a state wherein the ECU is attached to the vehicle body side, when the duct cover is to be attached, there is no necessity to bend or curve the wiring line for the ECU, and the ease of assembly can be improved.

According to other embodiments, the ECU can be attached to the attaching stay, which extends downwardly from the frame pipe disposed in the vehicle widthwise direction, through the cover member. Therefore, vibration upon traveling which is transmitted to the ECU, vibration of the engine and so forth can be reduced.

According to another embodiment, the ECU can be disposed at the position overlapping with the engine as viewed in a side elevation of the vehicle body. Therefore, the ECU is disposed at a position nearer to the engine, and the length of wiring lines for connecting sensors and the ECU to each other can be further reduced.

According to another embodiment, the slits can be disposed on the inner side in the vehicle widthwise direction with respect to the ECU. Therefore, even if water, small foreign articles, and so forth invade through the slits, it is possible to prevent them from coming directly to the ECU.

DESCRIPTION OF PREFERRED EMBODIMENTS

Figure 1:
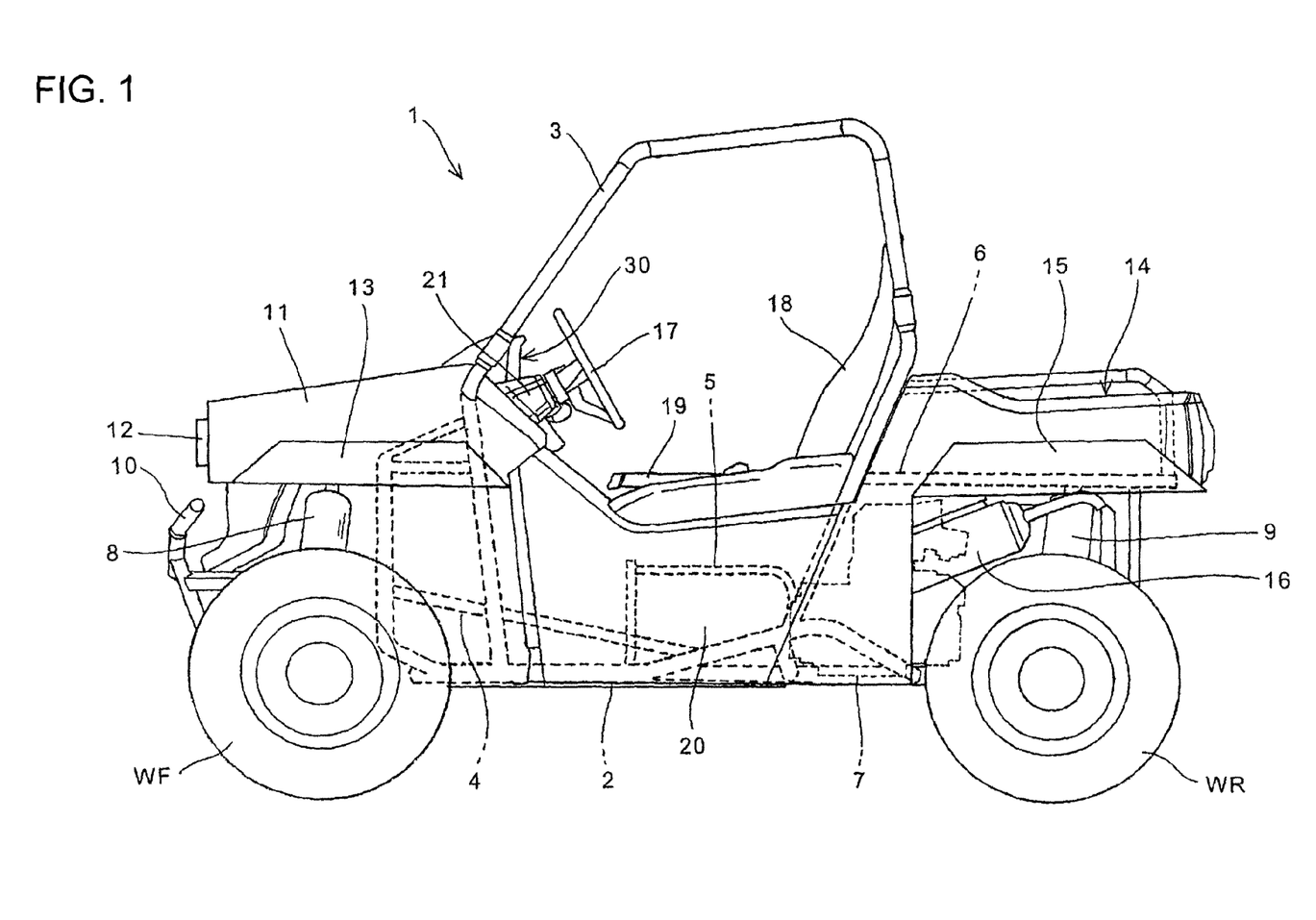
FIG. 1 is a left side elevational view of an MUV to which an ECU arrangement structure for a vehicle according to an embodiment of the present invention is applied.
Figure 2:
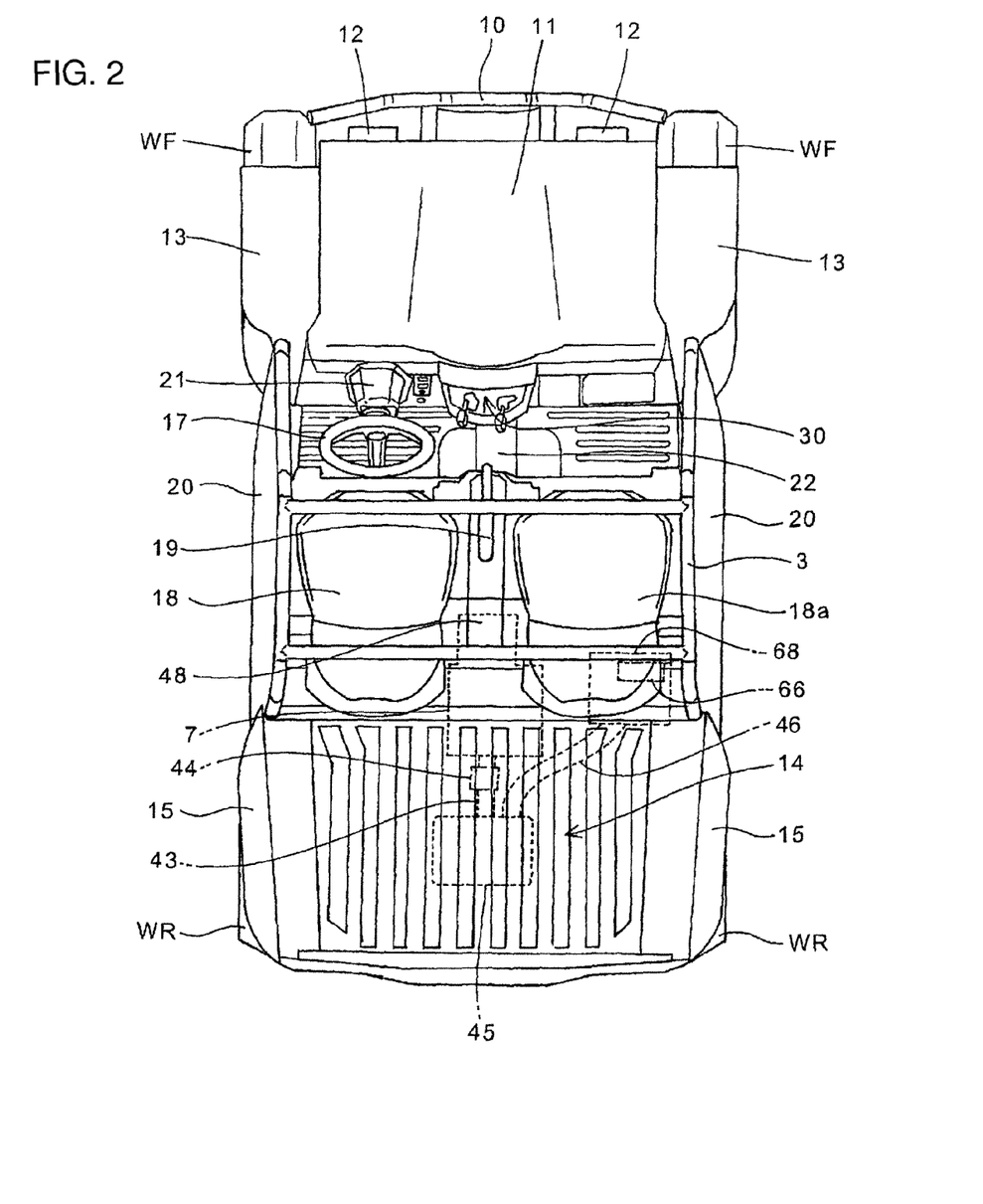
FIG. 2 is a top plan view of the MUV.

In the following, a preferred embodiment of the present invention is described in detail with reference to the drawings. FIG. 1 is a side elevational view of a four-wheel vehicle 1 to which an arrangement structure for a vehicle switch according to an embodiment of the present invention is applied. Meanwhile, FIG. 2 is a top plan view of the four-wheel vehicle 1. The four-wheel vehicle 1 in this example is a two-person multi-utility four-wheel vehicle (MUV: multi-utility vehicle) having a cabin which is not screened from the outside. In the following, the four-wheel vehicle is referred to as MUV 1.

A vehicle body frame 2 of the MUV 1 can be formed by combination of a plurality of steel pipes (frame pipes) and so forth. An engine 7 having an automatic change gear provided integrally thereon is attached to the vehicle body rear side of the vehicle body frame 2. A pair of left and right front wheels WF and a pair of left and right rear wheels WR are supported on the vehicle body frame 2 through suspension arms not shown and front wheel shock absorbers 8 and rear wheel shock absorbers 9, respectively. The MUV 1 is a four-wheel drive car, and driving force of the engine 7 is not only transmitted to the rear wheels WR but also transmitted to a differential gear for the front wheels WF through a propeller shaft (refer to FIG. 3) 36 disposed in a vehicle body forward and backward direction. A muffler 16 is disposed on the left side of the vehicle body with respect to the engine 7.

A driver's seat 18 and a passenger's seat 18a can be disposed substantially at the center in the vehicle forward and backward direction. A seat frame 5 for supporting the driver's seat 18 and the passenger's seat 18a juxtaposed in the vehicle widthwise direction is coupled to the vehicle body frame 2. Totaling four such seat frames 5 are disposed in a juxtaposed relationship in the vehicle widthwise direction. A rear frame 6 for supporting a carrier 14 is coupled upwardly rearwardly of the seat frame 5.

Further, a reinforcing frame 4 extending forwardly upwardly toward the front of the vehicle body can be provided at the center in the vehicle widthwise direction of the vehicle body frame 2. The reinforcing frame 4 is formed from a frame pipe extending in a horizontal direction and another frame pipe extending in a vertical direction which are coupled obliquely to each other to raise the rigidity of the vehicle body frame 2. A rollover bar 3 for assuring a seated space for passengers is provided at an upper portion of the vehicle body frame 2, and a bumper 10 is coupled to an end portion on the vehicle body front side.

A front cover 11 to which a pair of left and right head lamps 12 are attached is disposed rearwardly upwardly of the bumper 10. Front fenders 13 for covering the front wheels WF as steered wheels from above are attached to the left and right in the widthwise direction of the front cover 11. Further, rear fenders 15 are attached upwardly of the rear wheels WR on the left and right in the vehicle widthwise direction of the carrier.

A vehicle body panel formed from an instrument panel 30 and a steering wheel column 21 is provided on the vehicle body front side with respect to the driver's seat 18 and the passenger's seat 18a. Instruments, operation levers and so forth are disposed at a central portion in the vehicle widthwise direction of the instrument panel 30. The steering wheel column 21 which covers a steering shaft (not shown) of a steering wheel is attached leftwardly in the vehicle widthwise direction of the instrument panel 30 in such a manner as to be erected uprightly toward the driver's side. Further, a center console 48 which supports a parking brake lever 19 is formed between the driver's seat 18 and the passenger's seat 18a. A floor tunnel 22 which covers the reinforcing pipes 4, propeller shaft and so forth is formed forwardly downwardly of the center console 48. Vehicle doors 20 which are opened and closed around front side portions of the vehicle body are attached to the outer sides in the vehicle widthwise direction of the driver's seat 18 and the passenger's seat 18a.

Figure 3:
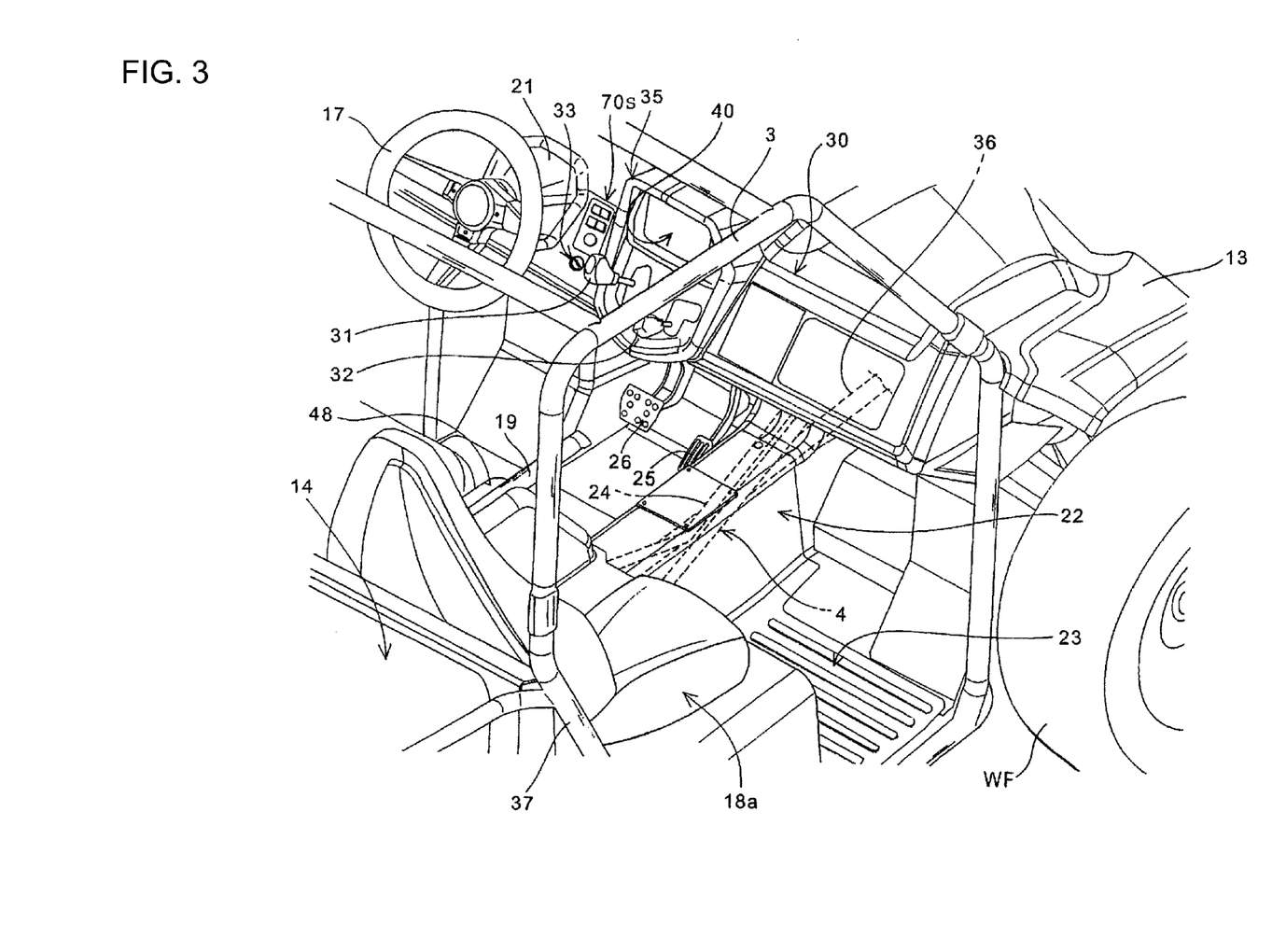
FIG. 3 is a partial enlarged perspective view of the MUV.

FIG. 3 is a partial enlarged perspective view of this example of the MUV 1. Like reference characters to those in the foregoing description denote like or equivalent elements. Foot receiving floors 23 for driver and passenger are formed on the left and right in the vehicle widthwise direction of the floor tunnel 22. The floor tunnel 22 is shaped in such a manner as to be erected uprightly upwardly of the vehicle body from the foot receiving floors 23, and the propeller shaft 36 directed in a substantially horizontal direction, the reinforcing frames 4 inclined rearwardly downwards toward the rear of the vehicle body and a main harness 24 laid along the reinforcing frames 4 are disposed in the floor tunnel 22. An accelerator pedal 25 and a brake pedal 26 are provided on the foot receiving floor 23 on the driver's seat 18 side.

A projection 35 on which a meter apparatus 40 including a speedometer, a distance meter and so forth and two levers for operating a driving force transmitting apparatus are provided is formed substantially at the center in the widthwise direction of the instrument panel 30 disposed in an opposing relationship to the driver's seat 18 and the passenger's seat 18a. The shift lever 31 on the left side in the vehicle widthwise direction is an operation lever for changing over the operation state of a transmission including drive (D), reverse (R), neutral (N) and parking (P) states. The dif lock lever 32 positioned adjacent on the right side of the shift lever 31 is an operation lever for changing over the differential gear for the front and rear wheels between a locked state and an unlocked state.

Leftwardly in the vehicle widthwise direction of the projection 35, the steering wheel column 21 which supports the steering wheel 17 is erected uprightly, but tilted towards the rear of the vehicle body. Between the steering wheel column 21 and the projection 35, a switch box 70S is disposed. Switch box 70S includes a light switch for changing over the operation state of the head lamps 12 and a starter switch for starting the engine is disposed. A main switch 33 for cooperating with a portable key to change over the main power supply between on and off states are disposed along with the switch box 70S in an upwardly and downwardly juxtaposed relationship.

Figure 4:
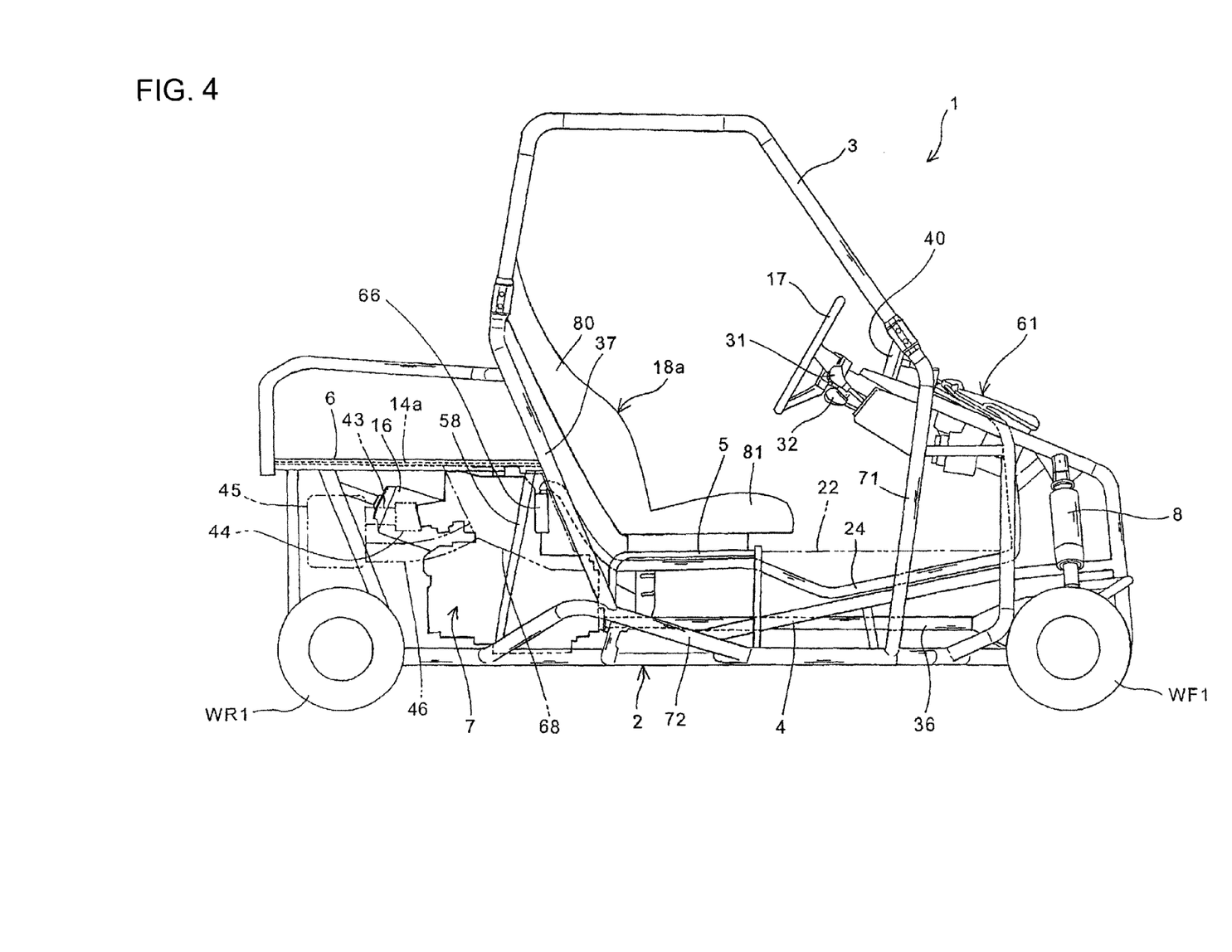
FIG. 4 is a right side elevational view of the MUV in a state wherein sheath parts are removed.
Figure 5:
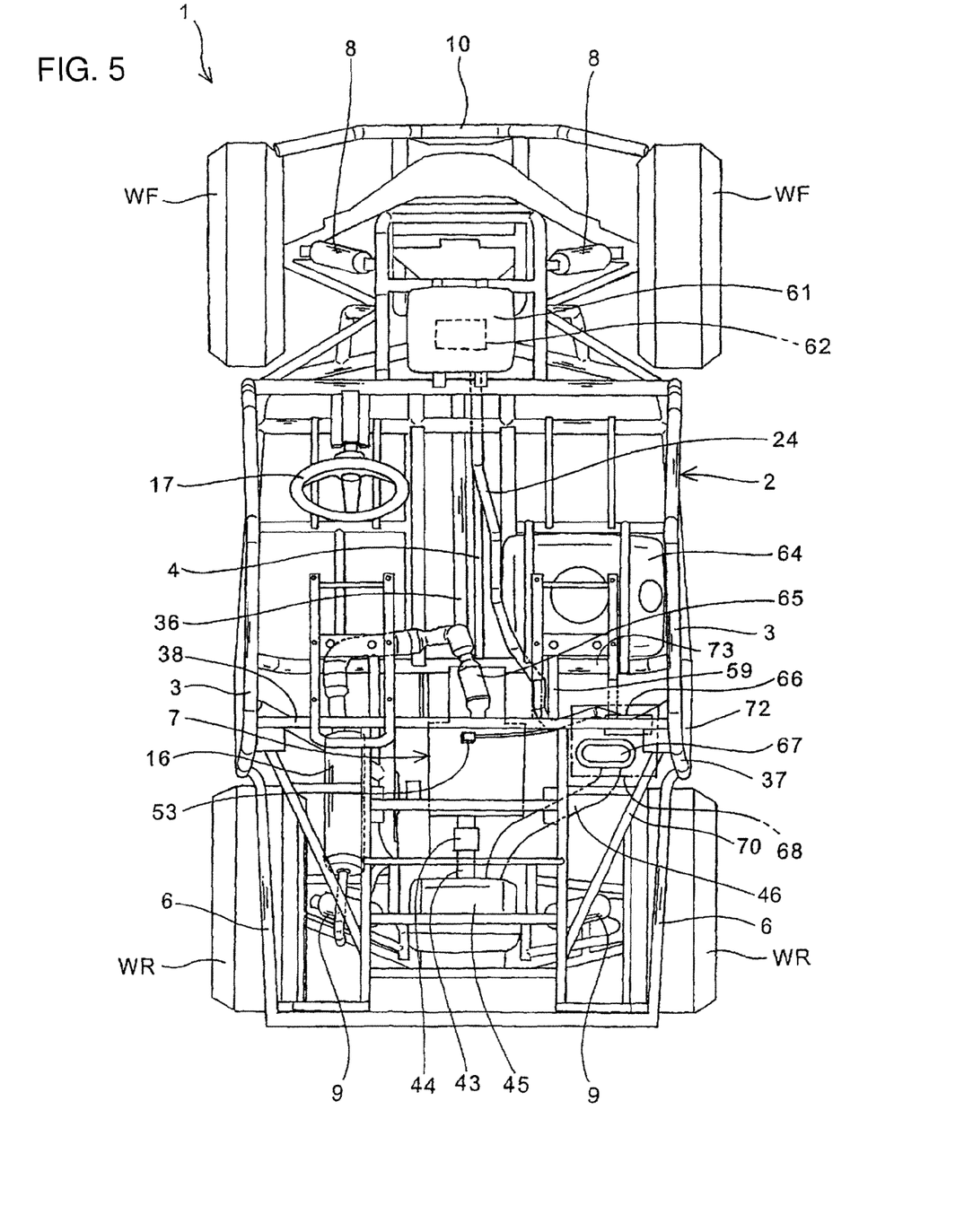
FIG. 5 is a top plan view of the MUV in a state wherein sheath parts are removed.
Figure 6:
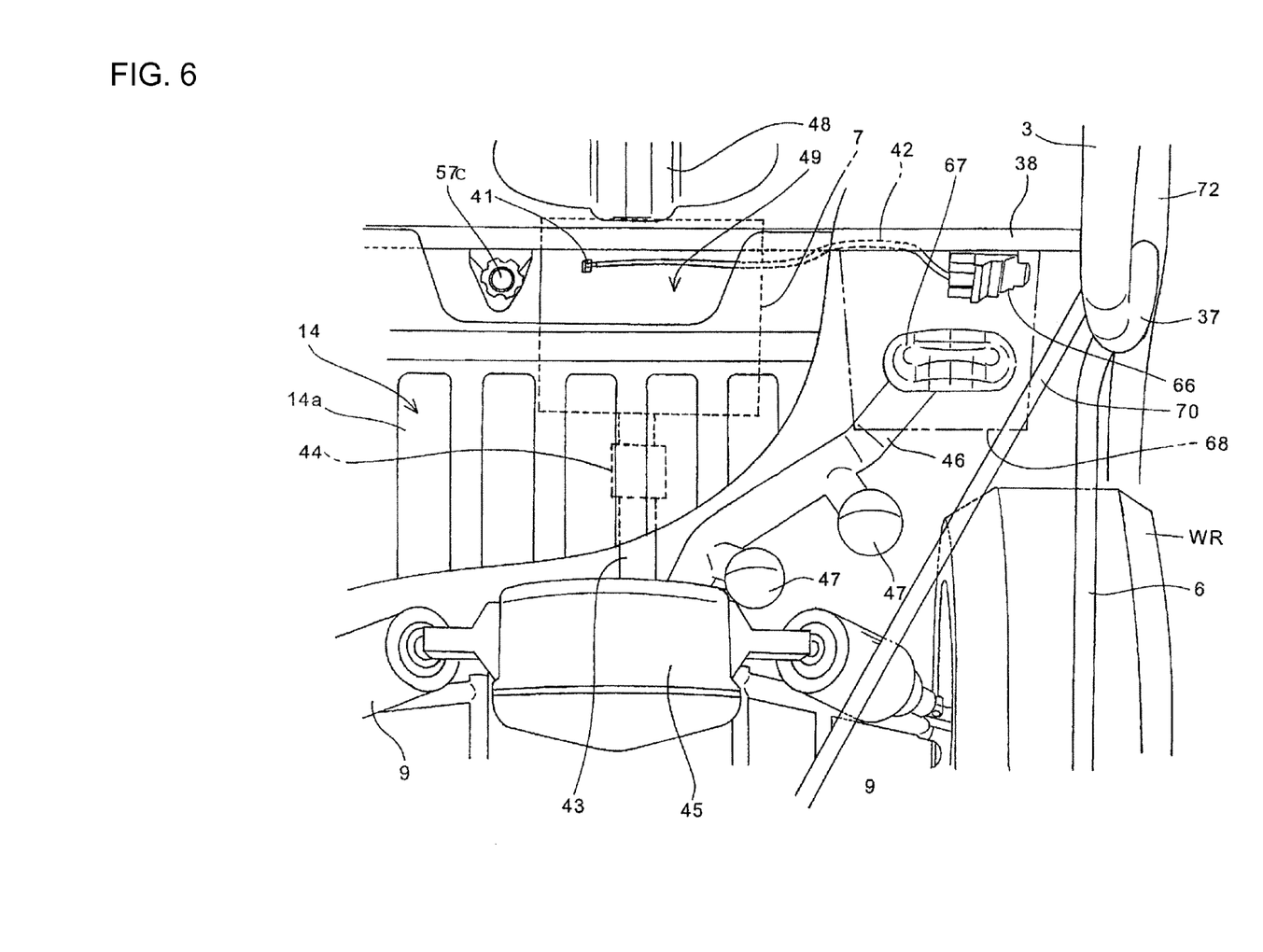
FIG. 6 is an enlarged top plan view of a rear portion of the vehicle.

FIG. 4 is a right side elevational view of an example of the MUV 1 in a state wherein sheath parts are removed. Meanwhile, FIG. 5 is a top plan view of the MUV 1 in a state wherein sheath parts are removed, and FIG. 6 is an enlarged view of part of FIG. 5. Like reference characters to those in the foregoing description denote like or equivalent elements. It is to be noted that FIG. 4 shows wheels WF1 and WR1 of the front and rear wheels.

Lower end portions of the rollover bar 3 are connected to rear side supporting pipes 37 inclined along the back portions 80 of the passenger's seat and coupled to lower frames 72 and front side supporting pipes 71 inclined forwardly in front of the steering wheel 17 and coupled to the lower frames 72. Consequently, a loop of frame pipes, as viewed in side elevation of the vehicle body, is formed. The pair of left and right loops in the leftward and rightward direction are connected to each other by a connecting pipe 38 which extends in the vehicle widthwise direction above the engine 7 and so forth, as shown in FIG. 5.

A battery box 61 for accommodating electric parts such as a vehicle-carried battery 62 and a fuse box is disposed at a central position in the vehicle widthwise direction on the vehicle body front side of the steering wheel 17. The battery box 61 is disposed at a higher position on the upper side of the vehicle body than that of the passenger's seat and can readily protect the electric parts from mud, splashed water and so forth from the tires upon traveling. Further, since the battery box 61 can be disposed in the proximity of the meter apparatus 40 on the vehicle body front side, wiring lines between the meter apparatus 40 and the battery box 61 can be shortened.

The engine 7 can be disposed at a position rearwardly and downwardly of the driver's seat 18 and the passenger's seat 18a substantially at the center in the vehicle widthwise direction. In the present embodiment, while the engine 7 is disposed on the vehicle body rear side with respect to a rear end portion of a seat portion 81 of the seat as viewed in top plan of the vehicle body, the engine 7 may otherwise be disposed, for example, in an overlapping relationship with the seat portion 81 of the seat as viewed in top plan of the vehicle body.

An ECU 66 as an engine controlling unit or apparatus is disposed rearwardly of the passenger's seat 18a. The ECU 66 and the battery box 61 can be connected to each other by the main harness 24 which is a bundle of wiring lines. Preferably, the main harness 24 is simple in layout and short in overall length. In the present embodiment, the battery box 61 is disposed at the center in the vehicle widthwise direction and the main harness 24 extending from the battery box 61 is threaded through the center in the vehicle widthwise direction and connected to the ECU 66 on the vehicle body rear side. Therefore, the overall length of the main harness 24 can be reduced in comparison with that in an alternative configuration wherein the main harness 24 detours, for example, to the outer side in the vehicle widthwise direction.

The main harness 24 is supported by the reinforcing frames 4 and led rearwardly downwardly of the vehicle body after it is extend downwardly of the vehicle body from the battery box 61. A portion of the main harness 24 which extends along the reinforcing frames 4 and an upright portion rearwardly of the portion of the main harness 24 are disposed on the inner side of the floor tunnel 22 (refer to FIG. 3). Since the reinforcing frame 4 is positioned upwardly of the vehicle body with respect to the propeller shaft 36 in the floor tunnel 22, the main harness 24 and the propeller shaft 36 do not interfere with each other.

The main harness 24 which passes in the floor tunnel 22 is raised to the height of the seat frame 5 and is laid to the vehicle body rear side along the lower face of the passenger's seat. Then, the main harness 24 is further directed upwardly in the proximity of the rear end portion of the seat frame 5 and connected to the ECU 66 positioned rearwardly of the vehicle body with respect to the passenger's seat 18a. Further, a bottom plate 14a of the carrier 14 is disposed at a position which overlaps with the rear frame 6 as viewed in side elevation of the vehicle body.

Referring to FIG. 5, the propeller shaft 36 is disposed at the center in the vehicle widthwise direction, and the reinforcing frames 4 are disposed on the right side in the vehicle widthwise direction with respect to the propeller shaft 36. A fuel tank 64 is disposed below the passenger's seat 18a. The main harness 24 is led to the rear of the vehicle body along the reinforcing frames 4 and is bent to the right side in the vehicle widthwise direction at a position rearwardly of the fuel tank 64 such that it is connected to the ECU 66. The engine 7 can be disposed such that an exhaust port (not shown) to which an exhaust pipe 65 is connected is directed to the vehicle body front side. The exhaust pipe 65 extending to the vehicle body front side is bent to the left side in the vehicle widthwise direction toward the vehicle body rear side and connected to the muffler 16.

An intake pipe 43 is connected to an intake port (not shown) provided on the rear side of the engine 7. A throttle body 44 in which a throttle valve (not shown) for adjusting the intake air amount is attached to the intake pipe 43. An air cleaner box 45 is connected to a rear end portion of the intake pipe 43, and an intake duct 46 for introducing external air into the air cleaner box 45 is connected on one end side thereof to the air cleaner box 45.

Figure 13:
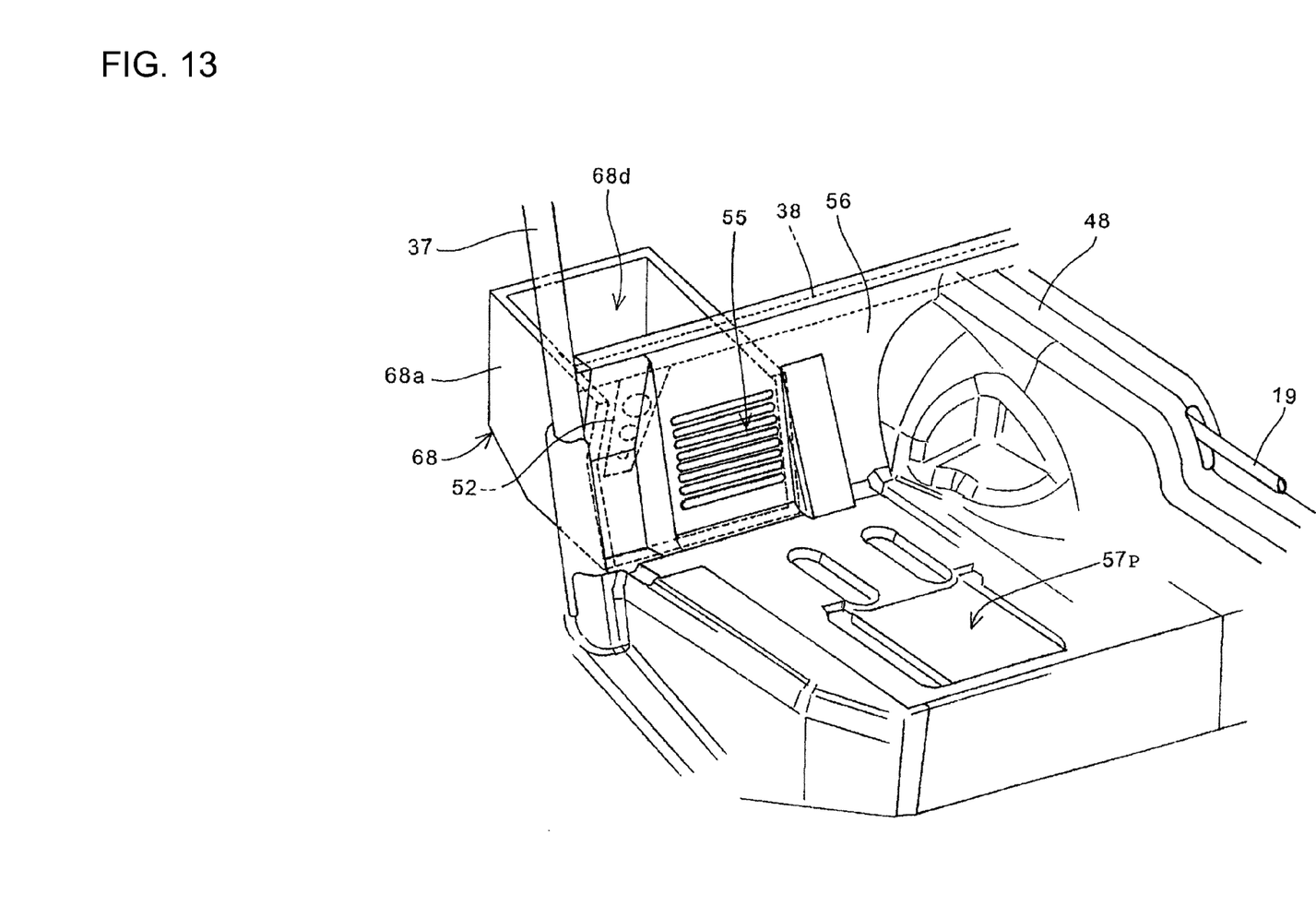
FIG. 13 is a perspective view illustrating a state wherein an assistant driver's seat is removed.

The intake duct 46 extends from the right side in the vehicle widthwise direction of the engine 7 and is inserted, at the other end side thereof, in and connected to the rear side of a duct cover 68 provided at a side portion of the engine 7. An intake cover or lid 67 having a labyrinth structure is attached to the other end side of the intake duct 46. As shown in FIG. 13, continuous opening 68d can be formed from the vehicle body front side to the vehicle body upper side on the duct cover 68. The vehicle body front side of the opening 68d is disposed in an opposing relationship to the back portion 80 of the passenger's seat 18a positioned on the right side in the vehicle widthwise direction. The ECU 66 can be disposed in the inside of the duct cover 68 on the vehicle body front side of the intake lid 67.

Figure 11:
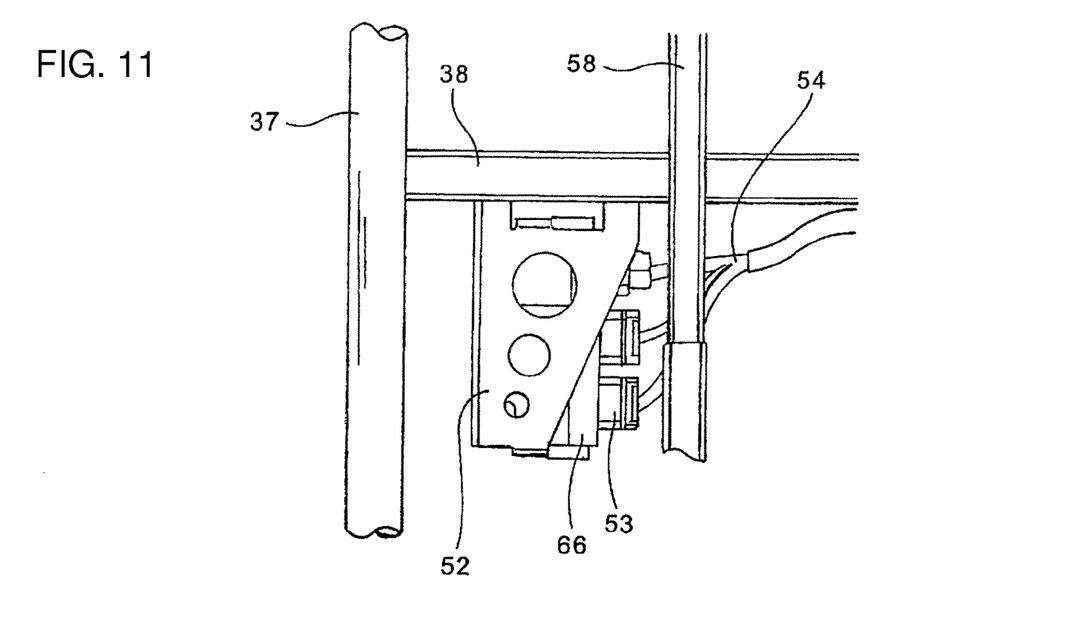
FIG. 11 is a view showing an attached state of the ECU as viewed from the vehicle body front side.

The connecting pipe 38 directed in the vehicle widthwise direction above the engine 7 is configured such that it connects the pair of left and right rear side supporting pipes 37 in the vehicle widthwise direction to each other at a position substantially at the center in the upward and downward direction. As shown in FIG. 11, the ECU 66 is secured to the connecting pipe 38 through an attaching stay 52. Further, reinforcing pipes 70P extending to the center side in the vehicle widthwise direction in a partially overlapping relationship with the duct cover 68 are connected in the proximity of the connecting portions between the connecting pipe 38 and the rear side supporting pipes 37.

Referring also to FIG. 6, a check coupler 41 for being connected to an external terminal to carry out a failure diagnosis or the like of the ECU 66 is connected to the ECU 66. A maintenance window 49, through which a refilling port cap 57C for engine cooling water can be accessed, is provided at an end portion of the carrier 14 of the MUV 1 on the vehicle front side. The maintenance window 49 is usually covered with a lid member not shown. The check coupler 41 connected to the ECU 66 through a wiring line 42 is disposed at a position substantially at the center in the vehicle widthwise direction of the maintenance window 49.

Two spherical resonators 47 having a function for the reduction of intake noise or the like can be attached to the intake duct 46. As described hereinabove, the intake duct 46 is configured so as to extend to the vehicle body front side from the right side in the vehicle widthwise direction and be inserted in and connected to the front face portion of the duct cover 68. The ECU 66 and the duct cover 68 are secured to the vehicle body frame 2 side independently of each other.

On the outermost sides in the vehicle widthwise direction of the vehicle body frame 2 described hereinabove, the lower frames 72 are disposed, and the rear side supporting pipes 37 and the rear frame 6 are disposed on the inner side of the lower frames 72. Since the duct cover 68 and the ECU 66 covered with the duct cover 68 are disposed on the inner sides in the vehicle widthwise direction with respect to the frame members, even where external force is applied to the vehicle body, the possibility that an influence of the external force may be had on the duct cover 68 and the ECU 66 can be reduced.

Figure 7:
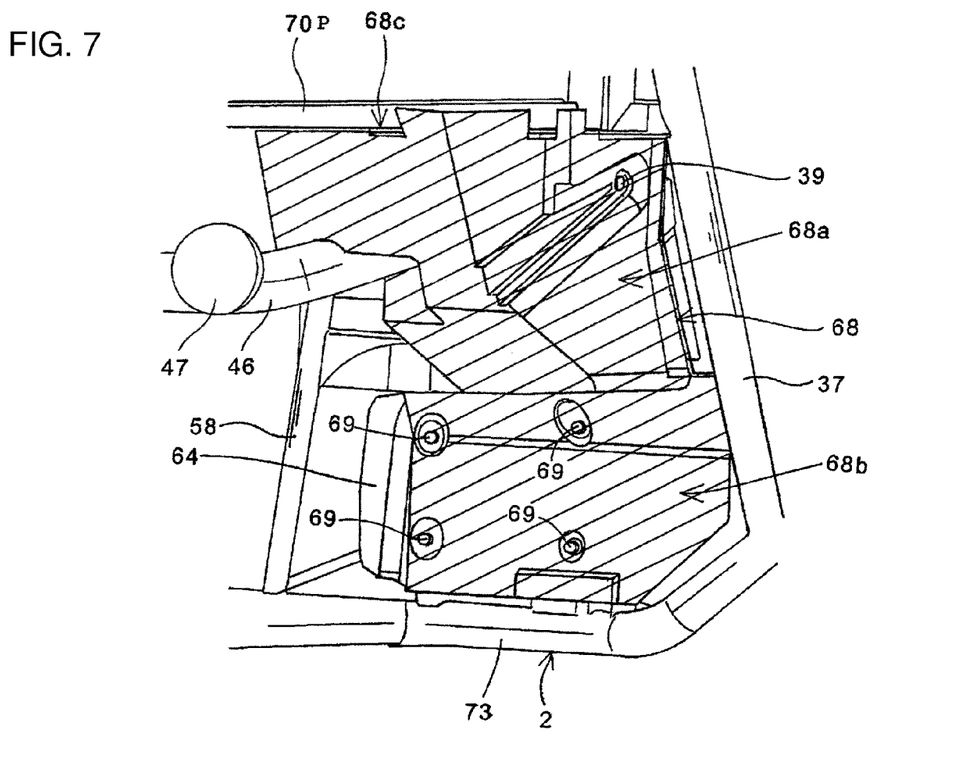
FIG. 7 is an enlarged perspective view of a duct cover attaching portion.
Figure 8:
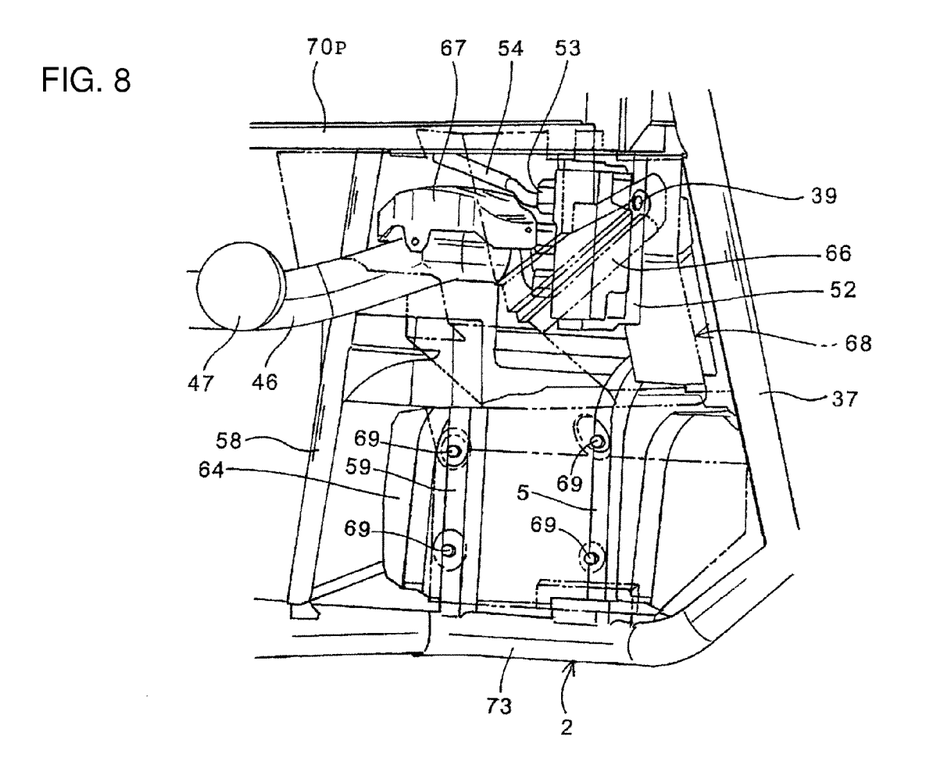
FIG. 8 is a partial perspective view of FIG. 7.

FIG. 7 is an enlarged perspective view of an attaching portion of the duct cover 68. Meanwhile, FIG. 8 is a partial perspective view of FIG. 7. Like reference characters to those in the foregoing description denote like or equivalent elements. The duct cover 68 made of resin or the like is configured such that it has a box-like portion 68a which has the continuous opening 68d (refer to FIG. 13) formed from the vehicle body front side to the vehicle body upper side as described hereinabove and the intake duct 46 is inserted in and connected to the vehicle body rear side of the box-like portion 68a. Further, a plate-like cover portion 68b for protecting the rear side of the fuel tank 64 is provided integrally at a lower portion of the box-like portion 68a. A cutaway portion 68c for allowing the reinforcing pipe 70 to pass therethrough is formed at an upper end portion of the box-like portion 68a.

The duct cover 68 according to the present embodiment is configured such that the opening on the vehicle body upper side is disposed in the proximity of the bottom plate 14a (refer to FIGS. 4 and 6) of the carrier 14 in such a manner that it is covered with a lid. Then, although details are hereinafter described, the opening on the vehicle body front side of the duct cover 68 is disposed in the proximity of a masking shield as a plate member for screening the engine room and the cabin from each other in such a manner as to be covered with a lid, and admission of external air into the air cleaner box 45 can be carried out principally through a slit formed in the masking shield.

The ECU 66 is attached to the attaching stay 52 secured to the connecting pipe 38. A connector 53 connected to a wiring line 54 is connected to the ECU 66. The wiring line 54 is connected to the main harness 24.

A frame pipe 58 extending in the vehicle body upward and downward direction is disposed on the inner side in the vehicle widthwise direction of the duct cover 68. Further, a frame pipe 59 extending in the vehicle body upward and downward direction and having an upper end connected to the connecting pipe 38 and a lower end connected to the lower frame 73 and the seat frame 5 (refer to FIG. 4) are disposed in a juxtaposed relationship in the vehicle widthwise direction rearwardly of the fuel tank 64. The plate-like cover portion 68b side of the duct cover 68 is secured to the seat frame 5 and the frame pipe 59 by totaling four fastening members 69 such as fastening screws. Meanwhile, the box-like portion 68a side of the duct cover 68 is secured to the attaching stay 52 by a fastening member 39 such as a fastening screw.

By the configuration described above, the ECU 66 and the duct cover 68 are connected to frame pipes different from each other. Consequently, the ECU 66, which can be a relatively heavy article, is supported on the vehicle body frame 2 side and the supporting rigidity of the ECU 66 is raised. Further, since the rigidity for allowing the duct cover 68 to support the ECU 66 becomes unnecessary, reduction in weight of the duct cover 68 can be realized. In addition, since the duct cover 68 can be attached in a state wherein the ECU 66 is attached to the vehicle body side, there is no necessity to bend or curve the wiring lines for the ECU 66 when the duct cover 68 is to be attached, and the assembling property can be improved.

Figure 9:
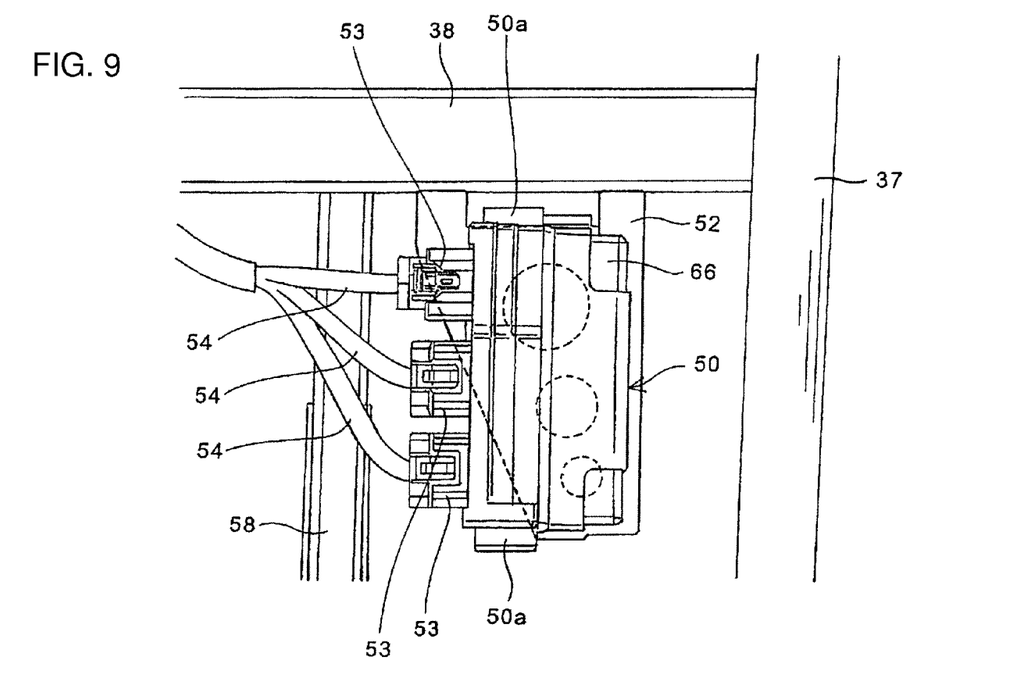
FIG. 9 is a view showing an attached state of an ECU as viewed from the vehicle body rear side.
Figure 10:
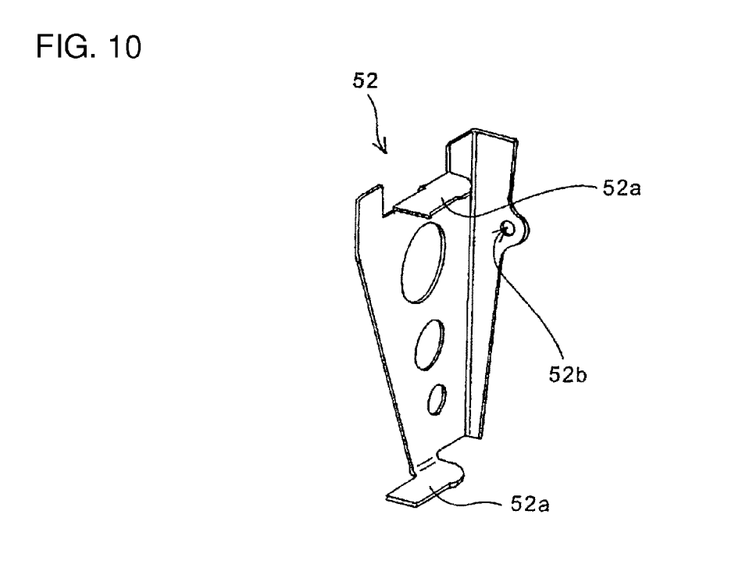
FIG. 10 is a perspective view of an attaching stay for the ECU.

FIG. 9 is a view showing an example of an attached state of the ECU 66 as viewed from the vehicle body rear side. FIG. 10 is a perspective view of the attaching stay 52 for the ECU 66, and FIG. 11 is a view showing an attached state of the ECU 66 as viewed from the vehicle body front side. The ECU 66 is held by a cover member 50 formed from resin or the like and held on the attaching stay 52 by attaching portions 50a, 50a formed in the vehicle body upward and downward direction of the cover member 50. Slits (not shown) into which insertion protrusions 52a, 52a formed on the attaching stay 52 are formed in the attaching portions 50a, 50a.

Referring to FIG. 10, the attaching stay 52 is formed from a steel plate or the like, and in the present embodiment, the attaching stay 52 is secured by welding an upper end portion thereof to the lower face of the connecting pipe 38. The insertion protrusions 52a, 52a to be inserted into the slits of the attaching portions 50a, 50a are formed at upper and lower portions of the attaching stay 52. An engaging hole 52b with which the fastening member 39 for the duct cover 68 is to be engaged is formed in a side portion of the attaching stay 52.

Referring to FIG. 11, the attaching stay 52 and the ECU 66 held by the attaching stay 52 are disposed in the proximity of the rear side supporting pipe 37, or in other words, at a position rather near to the outer side in the vehicle widthwise direction. By the disposition, while the possibility that the ECU 66 may be influenced by heat of the engine is further reduced, it is possible to protect the ECU 66 by means of a frame pipe such as the rear side supporting pipe 37 even when external force is applied. Further, the ECU 66 in the form of a substantially parallelepiped is disposed such that a face thereof which has the greatest area is directed to the vehicle body front side. Consequently, it is possible to raise the cooling effect by external air admitted in from the opening of the duct cover 68. Large, medium and small holes from above are provided in the attaching stay 52 to achieve expansion of the area over which external air blows directly against the ECU 66.

Figure 12:
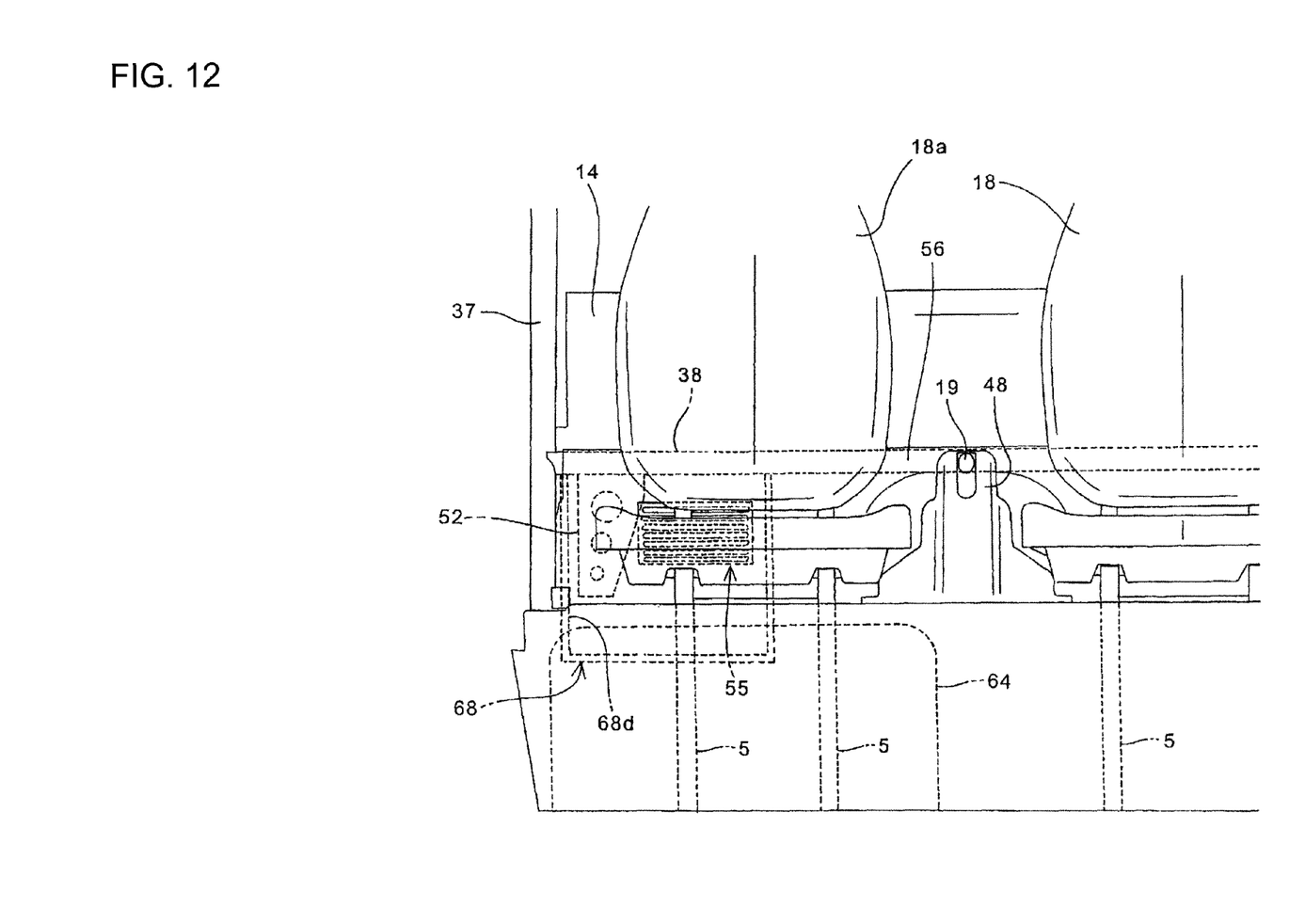
FIG. 12 is a view showing a disposition relationship of the attaching stay for and an intake slit of the ECU.

FIG. 12 is a view showing a disposition relationship of the attaching stay 52 for and intake slits 55 of the ECU 66. Meanwhile, FIG. 13 is a perspective view illustrating a state wherein the passenger's seat 18a is removed. Like reference characters to those in the foregoing description denote like or equivalent elements. The passenger's seat 18a is attached to a pedestal portion 57P. On the rear face side of the driver's seat 18 and the passenger's seat 18a, the masking shield 56 for separating the engine room and the cabin from each other is provided. The slits 55 for admitting external air in to the duct cover 68 are formed in the masking shield 56. The duct cover 68 is attached in such a manner that the vehicle body front side of the opening 68d thereof is disposed in the proximity of the masking shield 56. Consequently, the opening 68d is covered in such a manner as to be capped, and admission of external air can be carried out principally through the slits 55.

Further, as shown in FIG. 13, the slits 55 is disposed on the inner side in the vehicle widthwise direction with respect to the attaching stay 52. Consequently, even where water, small foreign articles, and so forth invade through the slits 55, it is possible to prevent them from striking directly on the ECU 66.

It is to be noted that the shape and the structure of the duct cover, intake duct, ECU, attaching stay, vehicle body frame, seats, masking shield and slits formed in the masking shield, the shape of the opening of the duct cover, the disposition of the engine and so forth are not limited to those of the embodiment described above but allow various modifications. For example, while, in the embodiment described above, a continuous opening is provided on the vehicle body front side and the vehicle body rear side of the duct cover, the opening may be provided only on the vehicle body front side. Furthermore, the duct cover may be disposed on the left side in the vehicle widthwise direction so that admission of external air may be carried out from a rear portion of the driver's seat. Further, the ECU arrangement structure for a vehicle according to the present invention can be applied to various three-wheel vehicles, four-wheel vehicles and so forth which have seats formed from a seat portion and a back portion.

1 . . . MUV (vehicle), 2 . . . Vehicle body frame, 7 . . . Engine, 14 . . . Carrier, 17 . . . Steering wheel, 18 . . . Driver's seat, 18a . . . passenger's seat, 24 . . . Main harness, 36 . . . Propeller shaft, 37 . . . Rear side supporting pipe, 38 . . . Connecting pipe, 40 . . . Meter apparatus, 45 . . . Air cleaner box, 52 . . . Attaching stay, 46 . . . Intake duct, 66 . . . ECU, 68 . . . Duct cover, 68a . . . Box-like portion, 68b . . . Plate-like cover portion, 68d . . . Opening, 55 . . . Slit, 56 . . . Masking shield (plate member), 72 . . . Lower frame, 14a . . . Bottom plate of carrier, 80 . . . Back portion, 81 . . . Seat portion

The invention claimed is:

1. An engine controller structure for a vehicle, comprising:
a duct cover comprising a box-like portion located on a front side thereof, said box-like portion including an opening formed therein, and configured to have an intake duct of an engine connected thereto, said duct cover being configured to be positioned sidewardly of an engine, and wherein an engine control unit is disposed on the inside of the duct cover, wherein the opening is configured such that the intake duct is connected to an air cleaner box attached to a vehicle body rear side of the engine, and wherein the intake duct is shaped so as to be extended to a vehicle body front side from the air cleaner box.

2. The engine controller structure according to claim 1, wherein the structure is configured to be mounted on a multi-utility four-wheel vehicle having an open cabin which is not enclosed from the outside, the vehicle having at least one seat provided substantially at a center in a vehicle body forward and rearward direction, wherein the engine is disposed rearwardly and downwardly of the at least one seat, and wherein the opening is provided in an opposing relationship to a back portion of the seat.

3. The engine controller structure according to claim 2, wherein the at least one seat includes a driver's seat and a passenger's seat juxtaposed with each other in a vehicle widthwise direction, and wherein said opening is provided in an opposing relationship to a back portion of one of said driver's seat and said passenger's seat.

4. The engine controller structure for a vehicle according to claim 2, wherein said structure further comprises a plate member disposed in an opposing relationship to said back portion of said one of said driver's seat and said passenger's seat, said plate member having a plurality of slits formed therein, and wherein said duct cover is disposed on a vehicle body rear side of said plate member.

5. The engine controller structure according to claim 4, wherein the opening of the duct cover is formed continuously from the vehicle body front side to a vehicle body upper side, wherein said opening is disposed closely to said plate member, and wherein said opening on the vehicle body upper side is disposed closely to a bottom plate of a carrier of the vehicle.

6. The engine controller structure according to claim 4, wherein the slits are disposed on an inner side in the vehicle widthwise direction with respect to the engine control unit.

7. The engine controller structure according to claim 1, wherein the engine control unit includes a substantially parallelepiped shape and is disposed at a position displaced forwardly of the vehicle body in an inside of the duct cover such that a face thereof having a largest area is directed to the vehicle body front side.

8. The engine controller structure according to claim 1, wherein said structure is configured to be mounted on a four-wheel vehicle having a vehicle body frame formed by a combination of a plurality of frame pipes, wherein said duct cover is disposed at a position on an inner side in a vehicle widthwise direction with respect to the frame pipe which is positioned on a most outer side in a vehicle widthwise direction, and wherein the engine control unit is disposed at a position displaced to the outer side in the vehicle widthwise direction in the inside of the duct cover.

9. The engine controller structure for a vehicle according to claim 8, wherein said engine control unit is configured to be attached to the frame pipe.

10. The engine controller structure according to claim 8, wherein said engine control unit is configured to be attached to an attaching stay which extends downwardly from a frame pipe disposed in the vehicle widthwise direction, through a cover member.

11. The engine controller structure according to claim 1, wherein the engine control unit is disposed at a position overlapping the engine as viewed in a side elevation of the vehicle body.

12. An engine controller structure for a vehicle, comprising:
duct cover means for covering a duct, said duct cover means configured to have an intake duct of an engine connected thereto, said duct cover means also being configured to be positioned sidewardly of an engine, and wherein an engine control means for controlling the engine is disposed on the inside of the duct cover means, wherein an opening of the duct cover means is configured to be connected to the intake duct, and the opening is configured such that the intake duct is connected to an air cleaner box attached to a vehicle body rear side of the engine, and wherein the intake duct is shaped so as to be extended to a vehicle body front side from the air cleaner box.

13. The engine controller structure according to claim 12, wherein the structure is configured to be mounted on a multi-utility four-wheel vehicle having an open cabin which is not enclosed from the outside, the vehicle having at least one seat provided substantially at a center in a vehicle body forward and rearward direction, wherein the engine is disposed rearwardly and downwardly of the at least one seat, and wherein the opening is provided in an opposing relationship to a back portion of the seat.

14. The engine controller structure according to claim 13, wherein the at least one seat includes a driver's seat and a passenger's seat juxtaposed with each other in a vehicle widthwise direction, and wherein said opening is provided in an opposing relationship to a back portion of one of said driver's seat and said passenger's seat.

15. The engine controller structure for a vehicle according to claim 13, wherein said structure further comprises plate means disposed in an opposing relationship to said back portion of said one of said driver's seat and said passenger's seat, said plate means having a plurality of slits formed therein, and wherein said duct cover means is disposed on a vehicle body rear side of said plate means.

16. The engine controller structure according to claim 15, wherein the opening of the duct cover means is formed continuously from the vehicle body front side to a vehicle body upper side, wherein said opening is disposed closely to said plate means, and wherein said opening on the vehicle body upper side is disposed closely to a bottom plate of a carrier of the vehicle.

17. The engine controller structure according to claim 15, wherein the slits are disposed on an inner side in the vehicle widthwise direction with respect to the engine control means.

18. The engine controller structure according to claim 12, wherein the engine control means includes a substantially parallelepiped shape and is disposed at a position displaced forwardly of the vehicle body in an inside of the duct cover means such that a face thereof having a largest area is directed to the vehicle body front side.

19. The engine controller structure according to claim 12, wherein said structure is configured to be mounted on a four-wheel vehicle having a vehicle body frame formed by a combination of a plurality of frame pipes, wherein said duct cover means is disposed at a position on an inner side in a vehicle widthwise direction with respect to the frame pipe which is positioned on a most outer side in a vehicle widthwise direction, and wherein the engine control means is disposed at a position displaced to the outer side in the vehicle widthwise direction in the inside of the duct cover means.

20. The engine controller structure for a vehicle according to claim 19, wherein said engine control means is configured to be attached to the frame pipe.

21. The engine controller structure according to claim 19, wherein said engine control means is configured to be attached to an attaching stay which extends downwardly from a frame pipe disposed in the vehicle widthwise direction, through a cover means.

22. The engine controller structure according to claim 12, wherein the engine control means is disposed at a position overlapping the engine as viewed in a side elevation of the vehicle body.

* * * * *